United States Patent [19]

Ratte

[11] Patent Number: 4,459,775
[45] Date of Patent: Jul. 17, 1984

[54] WEEDLESS SINKER

[75] Inventor: Robert W. Ratte, North Oaks, Minn.

[73] Assignee: Water Gremlin Company, White Bear Lake, Minn.

[21] Appl. No.: 392,943

[22] Filed: Jun. 28, 1982

[51] Int. Cl.³ ............................................. A01K 95/00
[52] U.S. Cl. .................................. 43/44.89; 43/44.91
[58] Field of Search ..................... 43/44.89, 44.9, 44.91

[56] References Cited

U.S. PATENT DOCUMENTS

| 399,866 | 3/1889 | Gage | 43/44.89 |
| 2,459,287 | 1/1949 | Robbins et al. | 43/44.89 X |
| 2,599,973 | 6/1952 | Bujaky | 43/44.9 X |
| 2,733,538 | 2/1956 | Alimas | 43/44.89 X |
| 3,557,486 | 1/1971 | Wright | 43/44.89 |
| 4,145,833 | 3/1979 | Ratte | 43/44.89 |

Primary Examiner—Nicholas P. Godici
Assistant Examiner—J. Reed Batten, Jr.
Attorney, Agent, or Firm—Jacobson & Johnson

[57] ABSTRACT

An attachment for a fishing line which comprises an elongated sinker having an end section with line grippers for locking onto a fishing line and a pair of eyes for holding the fishing line in proper position. The interior of the sinker contains a groove which holds the fishing line in the center of the sinker and a pair of line gripping members located on the end of the sinker coact with the body of the sinker to firmly hold the line in the sinker. A line organizer forms part of the eye and prevents the opening in the end of the sinker from being closed during the tumbling action that sinkers encounter prior to use. The sinker body can be mounted on the fishing line so the sinker body remains symmetrical with respect to the fishing line to thereby produce a weedless sinker that maintains its alignment with the fishing line.

6 Claims, 5 Drawing Figures

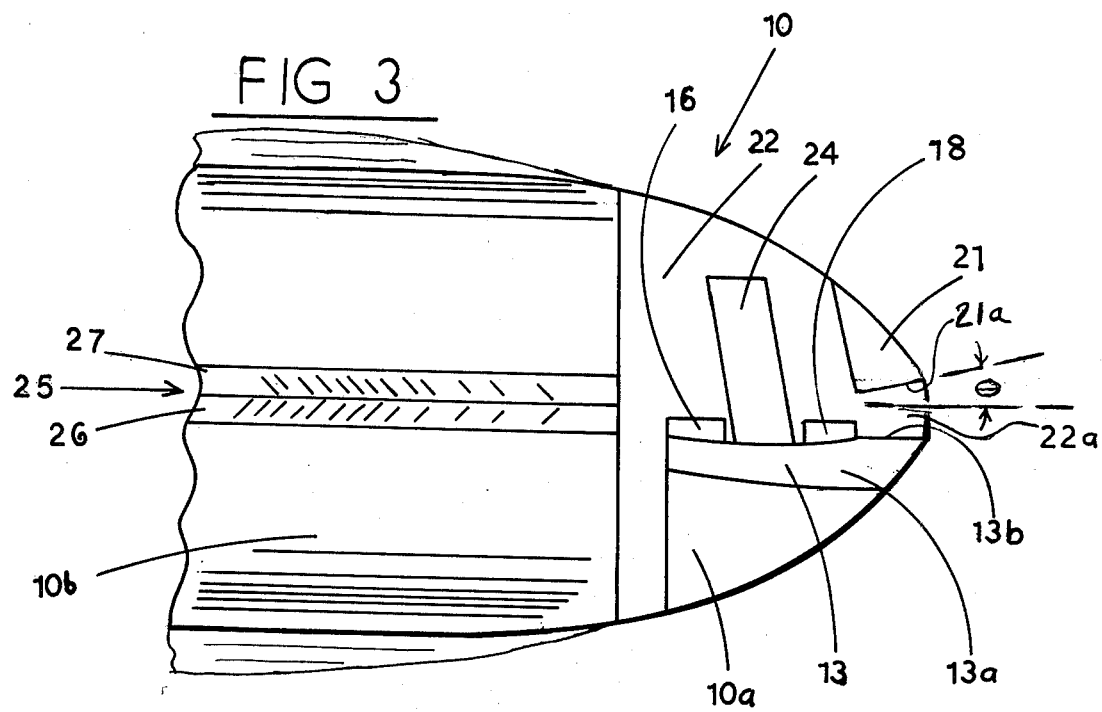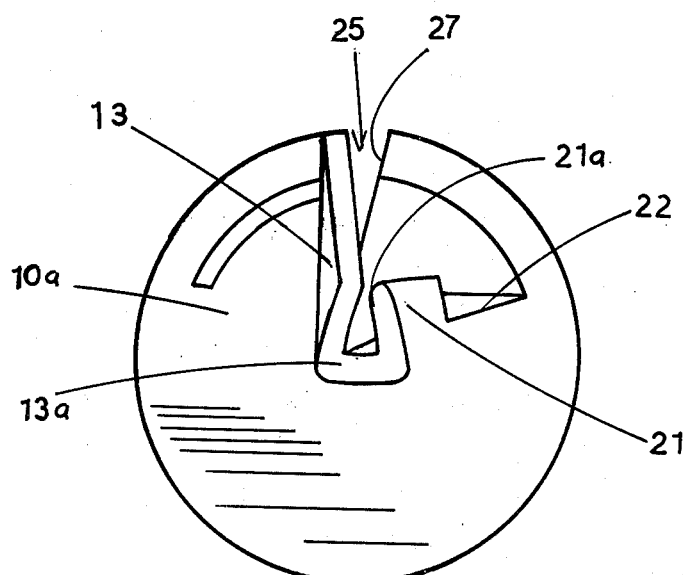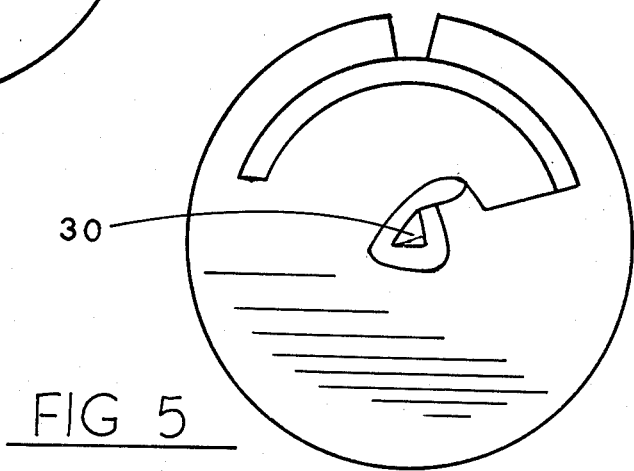

WEEDLESS SINKER

BACKGROUND OF THE INVENTION

1. Field of the Invention

This invention relates generally to a weedless sinker and, more specifically, to improvements to weedless sinkers that can be quickly and centrally attached to a fishing line.

2. Description of the Prior Art

The fishing sinker and fishing industry has grown vastly in the past few years. One of the most useful items in the fisherman's tackle box is the type of sinker which is shown in the Vironda U.S. Pat. No. 2,701,427, which is assigned to the same assignee as the present invention. Briefly, this invention comprises a round shot type sinker having a slot that extends through the sinker. This particular fishing sinker has enjoyed extreme popularity and widespread use because it can be easily attached to a fishing line by pinching the sinker around the line. Although this type of a sinker enjoys widespread popularity, there are some disadvantages to this type of sinker. For example, the line usually passes through the sinker in an off-center position or the sinker's rounded stubby shape allows the sinker to catch on weeds as the sinker is pulled through the water.

Still another type of prior art attachment to fishing lines is shown in the Hribar U.S. Pat. No. 3,608,230. The Hribar patent shows a round shot sinker having a cushioning insert extending through the body of the sinker. The insert cushions and holds the line within the sinker body and prevents undue wear on the line.

Still another embodiment is shown in the Pancoast U.S. Pat. No. 1,023,676 which shows a sinker comprised of a number of different members having an increasing diameter from one end to the other.

Still another type of sinker is shown in applicant's U.S. Pat. No. 4,145,833 which shows a weedless sinker having a streamline exterior shape and line holding means on the inside to hold the line within the confines of the sinker. Applicant's own patent is one of the first attempts of making a truly weedless sinker that a fisherman can attach to a fishing line with his fingers or the like.

The present invention comprises an improvement to the art of weedless sinkers by providing a sinker for attachment to a fishing line in which the ends of the sinker body are made with foldable nubs that have a converging streamlined shape and the interior of the sinker contains a line organizer that coacts with the foldable nubs to form an eye on the end of the sinker to insure that the line is always held in a central position with respect to the sinker.

SUMMARY OF THE INVENTION

Briefly, the present invention comprises an elongated streamlined sinker body having a foldable nub on each end. The sinker body contains internal members for holding the line in the sinker and eyes on the ends of the sinker to insure that the line is held in a central position with respect to the sinker. Because the fishing line is symmetrically located with respect to the sinker body and the sinker body has a streamlined shape, the sinker is of the weedless type.

BRIEF DESCRIPTION OF THE DRAWING

FIG. 3 is a top view of the end of the sinker shown in FIG. 1;

FIG. 4 is an end view of a sinker in the open position; and;

FIG. 5 is an end view of the sinker in the closed position.

DESCRIPTION OF THE PREFERRED EMBODIMENT

Figure 1:
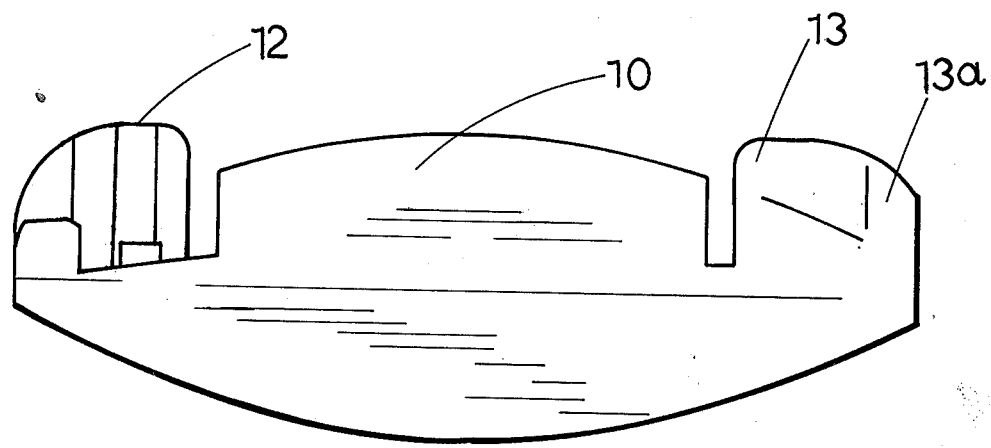
FIG. 1 is a side view of a sinker body in the open position.

Referring to FIGS. 1-4 reference numeral 10 generally designates an elongated one-piece lead fishing sinker having two end lines holding members or folding nubs 12 and 13 which are formed in each end of lead sinker 10. In the present embodiment the use of hand bendable nubs 12 and 13 which are formed of lead permits nubs 12 and 13 to be opened and closed around a line 14.

Figure 2:
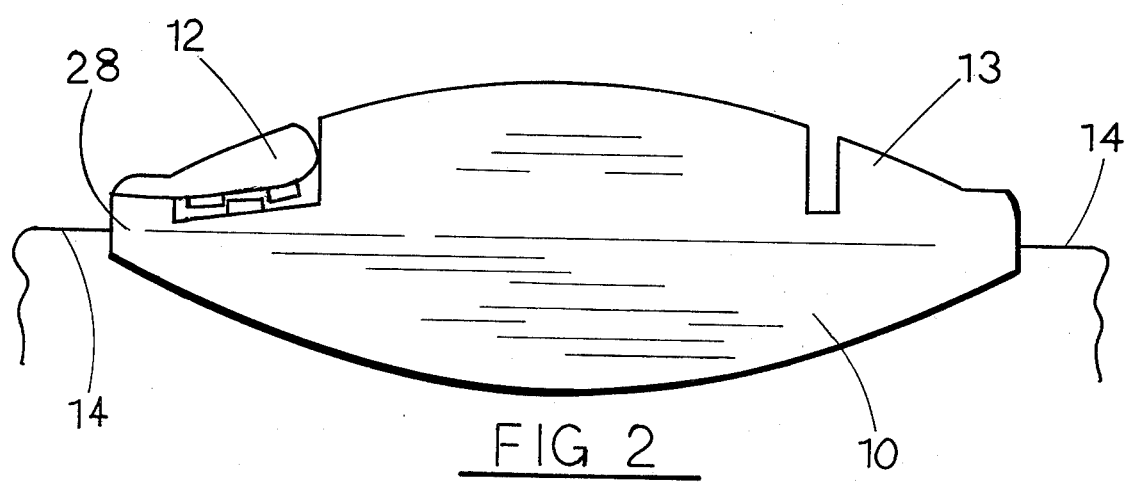
FIG. 2 is a side view of a sinker body in a closed position around a line.

FIG. 2 shows the external appearance of a sinker when there is a line 14 passing through sinker 10. Line 14 is held in place by line grippers which are located on nubs 12 and 13.

FIG. 3 reveals the details of one of the ends of sinker 10 from a top view and FIG. 4 reveals the details of one of the ends of sinker 10 from an end view. Since both ends of sinker 10 are identical only the parts on one end will be described. Located on one end of sinker 10 is a folding nub 13 having a pair of line gripping members or line grippers 16 and 18. Line grippers 16 and 18 comprise ridges that extend from the outer surface of sinker 10 toward the interior of sinker 10. Similarly, located on surface 22 is a line gripping member or line gripper 24 which also comprises a raised surface which extends from the junction of folding nub 13 with sinker 10 outward toward the exterior surface of sinker 10. Line gripping members 16 and 18 coact with line gripping member 13 to lock or clamp line 14 within sinker 10. FIG. 2 illustrates how line 14 is locked or clamped between the line gripping members.

Located in the central portion of sinker 10 is a V-shaped groove 25 (FIG. 3) which has a pair of flat sides 26 and 27 which converge to an apex. It is preferred to have the apex terminate slightly above the level of surface 22 so that when a line extends through sinker body 10 and is held down by nubs 12 and 13, the line wedges itself in the V-shape of groove 25 through the folding of nubs 12 and 13 against surface 22.

FIGS. 1 and 3 show nub 13 in an extended or unfolded position with nub 13 projecting outward beyond the streamline shape of sinker 10. Nub 13 has a tapered front end 13a which, when folded over conforms to the outer streamlined body shape of sinker 10. FIG. 2 shows the front and back of nubs 12 and 13 in the folded position which produces a streamlined sinker body shape having a streamlined exterior surface that will not snag on weeds.

The details of the nubs can be seen by referring to FIGS. 3 and 4. Located on the outside surface of sinker 10 and adjacent to nub 13 is an exterior sinker surface section 10a which forms a portion of the symmetrical body shape of the sinker. Nub 13 projects upward from surface section 10a and is slightly offset from a center line through sinker body 10 so that when nub 13 is folded over it forms a confinement region to permit the fishing line to be centered with respect to sinker 10. Similarly, sinker body has an opposite surface section 10b.

FIG. 2 illustrates that when nub 13 is folded over on ends 28 the line grippers intermesh to permit a fishing line to be held between the line gripping members located on folding nub 13 and the line gripping member 24 located on the bottom surface 22. Also, as V-shaped groove 25 has side surfaces 26 and 27 that converge to an apex which is spaced above the surface 22 the fishing line 14 is pulled into V-shaped groove 25 by the folding of nubs 12 and 13 onto surface 22.

One of the features of the present invention is that sinker 10 can be mounted on a fishing line even though sinker 10 may have been carried and tumbled about in a container for a period of time. That is, to permit mounting sinker 10 on a line there is provided a line organizer 21 which is located on each end of sinker 10. Line organizer 21 comprises an extension of sinker body 10 and has a line engaging surface 13b, a line engaging surface 22a and diverging surface 21a that forms an angle of about 15° or more with respect to a center line through sinker body 10. It has been found that diverging surface 21a eliminates the problem of the end sinker being closed due to sinkers tumbling about in a container. That is, sinkers are usually placed in boxes and tubes and are transported from place to place by both the manufacturer and the user. It has been found that if line organizer 21 has a diverging surface 21a the tumbling action of the ends of the sinkers against one another prevents the ends of soft lead from being hammered closed during the tumbling encounter in handling and transportation of the lead sinkers. If the end of sinker 10 is closed, it is difficult or impossible to place the line centrally in sinker 10.

The symmetrical feature of the invention can be seen by referring to FIG. 2 which shows sinker 10 with nub 13 and 12 in a folded position on line 14 and sinker 10 located symmetrical with respect to line 14. Thus, the present invention provides a sinker which has a streamlined shape, holds the line firmly, can be used even after repeated tumbling of the sinkers in the containers.

Still another feature of the inventor's is that line organizer 21 also functions as side restraint to prevent lateral motion of line 14 as it is squeezed by line gripping members 16, 18 and 24 while also performing the function of a stop for nub 13, i.e., the height of line organizer 21 is such that when nub 13 is folded over, it insures that an eye or opening 30 is formed in the end of sinker 10 (FIG. 5). The significance is that line 14 is not pinched at the end of sinker 10 but is held in position by eye 30. Consequently, when one folds over nub 13 one is assured that not only will the line be centered with respect to sinker body 10 but that it will be held within the confines of the eyes located on opposite ends of sinker 10.

I claim:

1. A weedless type sinker for storage in a bulk condition prior to using the sinker, said sinker having a center line and a general streamlined shape comprising a sinker body having a first end and a second end;
   a nub located on one end of said sinker for folding over to grasp a line;
   a line organizer located in a spaced position from said nub, said line organizer including a first upward extending line engaging surface, a second upward extending line engaging surface and a third line engaging surface connecting said first upward extending line engaging surface to said second upward extending line engaging surface, said first upward extending line engaging surface and said second upward extending line engaging surface coacting to prevent lateral displacement of a line located therebetween, one of said line engaging surfaces forming a minimum diverging angle of about 15° with respect to the center line through said sinker to thereby prevent the opening between said first upward extending line engaging surface, said second upward extending line engaging surface and said third line engaging surface from being closed by repeated tumbling of said sinkers, said line organizer having sufficient height so that when said nub is folded over to grasp a line, said nub and said line organizer coact to define an opening in the end of said sinker to thereby function as an eye for a fishing line.

2. The sinker of claim 1 wherein one of said line engaging surfaces diverges outward to prevent said opening in the end of the sinker from closing during handling of said sinker.

3. The sinker of claim 1 wherein said sinker includes a V-shaped line engaging member having an apex located above the center line of said sinker.

4. The sinker of claim 1 wherein said sinker has a nub on each end.

5. The sinker of claim 1 wherein said line organizer projects sufficient distance to form a stop for said nub when said nub is folded around a fishing line.

6. The sinker of claim 5 wherein said nub has a shape that conforms to the streamlined body shape of the sinker when the nub is in a folded position around a line.

* * * * *